(12) United States Patent
Boothroyd et al.

(10) Patent No.: US 10,901,603 B2
(45) Date of Patent: Jan. 26, 2021

(54) VISUAL MESSAGING METHOD AND SYSTEM

(71) Applicant: NEXTWAVE SOFTWARE INC., Vancouver (CA)

(72) Inventors: Christopher Craig Boothroyd, Vancouver (CA); Corey Auger, North Vancouver (CA)

(73) Assignee: Conversant Teamware Inc., Vancouver (CA)

( * ) Notice: Subject to any disclaimer, the term of this patent is extended or adjusted under 35 U.S.C. 154(b) by 0 days.

(21) Appl. No.: 15/779,644

(22) PCT Filed: Dec. 5, 2016

(86) PCT No.: PCT/CA2016/051427
§ 371 (c)(1),
(2) Date: May 29, 2018

(87) PCT Pub. No.: WO2017/091910
PCT Pub. Date: Jun. 8, 2017

(65) Prior Publication Data
US 2018/0356952 A1 Dec. 13, 2018

Related U.S. Application Data

(60) Provisional application No. 62/263,446, filed on Dec. 4, 2015.

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 3/0482* (2013.01); *G06F 3/14* (2013.01);
(Continued)

(58) Field of Classification Search
CPC ....... H04W 4/14; G06F 3/0482; G06F 3/0486
See application file for complete search history.

(56) References Cited

U.S. PATENT DOCUMENTS

| 6,029,141 A | 2/2000 | Bezos et al. |
| 6,557,027 B1 | 4/2003 | Cragun |

(Continued)

FOREIGN PATENT DOCUMENTS

EP 1998518 B1 5/2009

OTHER PUBLICATIONS

PCT International Search Report dated Jul. 24, 2015 for PCT Appl. No. PCT/CA2015/050444.
(Continued)

*Primary Examiner* — Claudia Dragoescu
(74) *Attorney, Agent, or Firm* — Oyen Wiggs Green & Mutala LLP

(57) ABSTRACT

A method of visually organizing multiple parallel chat topics on the display screens of mobile devices used in messaging conversations is provided. Visual media and external apps are integrated into such displays, by forming parallel orthogonally spaced chat threads, where preferably each chat thread has a visual element associated with it displayed in a visual display area. The different chat participants can each manipulate or interact with the visual element of any selected chat thread.

31 Claims, 12 Drawing Sheets

(51) Int. Cl.
*H04L 12/58* (2006.01)
*G06F 3/14* (2006.01)
*G06Q 50/00* (2012.01)
*G06Q 10/10* (2012.01)
*G06F 3/0482* (2013.01)
*G09G 5/34* (2006.01)

(52) U.S. Cl.
CPC ............. *G06Q 10/10* (2013.01); *G06Q 50/01* (2013.01); *H04L 51/046* (2013.01); *H04L 51/10* (2013.01); *H04L 51/16* (2013.01); *H04L 51/32* (2013.01); *G09G 5/346* (2013.01); *G09G 2352/00* (2013.01); *G09G 2354/00* (2013.01); *G09G 2370/02* (2013.01); *G09G 2370/16* (2013.01)

(56) References Cited

U.S. PATENT DOCUMENTS

| | | | |
|---|---|---|---|
| 7,039,677 | B2 | 5/2006 | Fitzpatrick et al. |
| 7,328,242 | B1 | 2/2008 | McCarthy et al. |
| 7,475,110 | B2 | 1/2009 | Kirkland et al. |
| 7,885,641 | B2 | 2/2011 | Tysowski |
| 8,693,643 | B2 | 4/2014 | Mikan et al. |
| 9,117,227 | B1 * | 8/2015 | Agrawal ............ G06Q 30/0242 |
| 9,286,397 | B1 | 3/2016 | Suleman et al. |
| 9,489,458 | B1 | 11/2016 | Haugen et al. |
| 2003/0212746 | A1 | 11/2003 | Fitzpatrick et al. |
| 2005/0149621 | A1 | 7/2005 | Kirkland et al. |
| 2005/0262199 | A1 * | 11/2005 | Chen ................... G06Q 10/107 709/204 |
| 2006/0059235 | A1 | 3/2006 | Peterson et al. |
| 2006/0195521 | A1 | 8/2006 | New et al. |
| 2008/0208812 | A1 | 8/2008 | Quoc et al. |
| 2009/0106040 | A1 | 4/2009 | Jones |
| 2009/0125499 | A1 | 5/2009 | Cross et al. |
| 2009/0164449 | A1 | 6/2009 | Huang |
| 2009/0245500 | A1 | 10/2009 | Wampler |
| 2009/0313334 | A1 | 12/2009 | Seacat et al. |
| 2010/0205541 | A1 | 8/2010 | Rapaport et al. |
| 2011/0137884 | A1 | 6/2011 | Anantharajan et al. |
| 2011/0163971 | A1 * | 7/2011 | Wagner ............... G06F 3/04817 345/173 |
| 2011/0289011 | A1 | 11/2011 | Hull et al. |
| 2012/0143843 | A1 | 6/2012 | Smyth et al. |
| 2012/0158633 | A1 | 6/2012 | Eder |
| 2012/0203846 | A1 | 8/2012 | Hull et al. |
| 2013/0145303 | A1 * | 6/2013 | Prakash .............. G06F 3/04883 715/779 |
| 2013/0215116 | A1 | 8/2013 | Siddique et al. |
| 2013/0254199 | A1 | 9/2013 | Surendran et al. |
| 2014/0074951 | A1 | 3/2014 | Misir |
| 2014/0136990 | A1 * | 5/2014 | Gonnen .................. H04L 51/18 715/752 |
| 2014/0236953 | A1 | 8/2014 | Rapaport et al. |
| 2014/0324982 | A1 | 10/2014 | Agrawal et al. |
| 2014/0344718 | A1 | 11/2014 | Rapaport et al. |
| 2015/0066479 | A1 | 3/2015 | Pasupalak et al. |
| 2015/0178388 | A1 | 6/2015 | Winnemoeller et al. |
| 2015/0235289 | A1 | 8/2015 | Jeremais |
| 2015/0295873 | A1 | 10/2015 | Orr |
| 2015/0302103 | A1 | 10/2015 | Jeremias |

OTHER PUBLICATIONS

PCT International Search Report dated Jan. 19, 2017 for PCT Appl. No. PCT/CA2016/051427.
Published article from Avaya Inc. Enhancing Customer Support Through Avaya Automated Chat, 2013.
Extended European Search Report dated Oct. 9, 2017 for European Appl. No. 15792073.7-1871 / 3143576 PCT/CA2015050444.
"Conceptual Graphs as a Universal Knowledge Representation", John F. Sowa, Computers & Mathematics With Applications, vol. 23, No. 2-5, Jan. 1, 1992, pp. 75-93.
Supplementary European Search Report issued on EP Appl. No. 16869455, completed May 13, 2019.
Fechner, Thore et al., "Ethermap—Real-time Collaborative Map Editing", Interactive & Multi-Surface Maps, CHI 2015, Crossings, Seoul, Korea; Human Factors in Computing Systems, ACM, 2 Penn Plaza, Suite 701 New York, NY, USA (Apr. 18, 2015).

* cited by examiner

☰ UserA, UserB, UserC

UserA - 12.45 pm
Hey, hows it going?

UserB - 12.46 pm
I'm hungry, lets go eat

UserC - 12.47 pm
lets eat and go see a movie!

UserB - 12.48 pm
I found a Chinese place close

UserC - 12.49 pm
Terminator 8 is playing!

UserA - 12.50 pm
No Chinese, No Terminator

UserB - 12.51 pm
Ok, how about Sushi?

10 {

≡ UserA, UserB, UserC

[ main ]   [ #eat ]   [ #movie ]

UserA - 12.45 pm
Hey, hows it going?

UserB - 12.46 pm
I'm hungry, lets go #eat

UserC - 12.47 pm
lets eat and go see a #movie!

UserB - 12.48 pm
I found a Chinese place close
eat

UserC - 12.49 pm
Terminator 8 is playing!
movie

UserA - 12.50 pm
No Chinese, No Terminator

UserB - 12.51 pm
Ok, how about Sushi?
eat

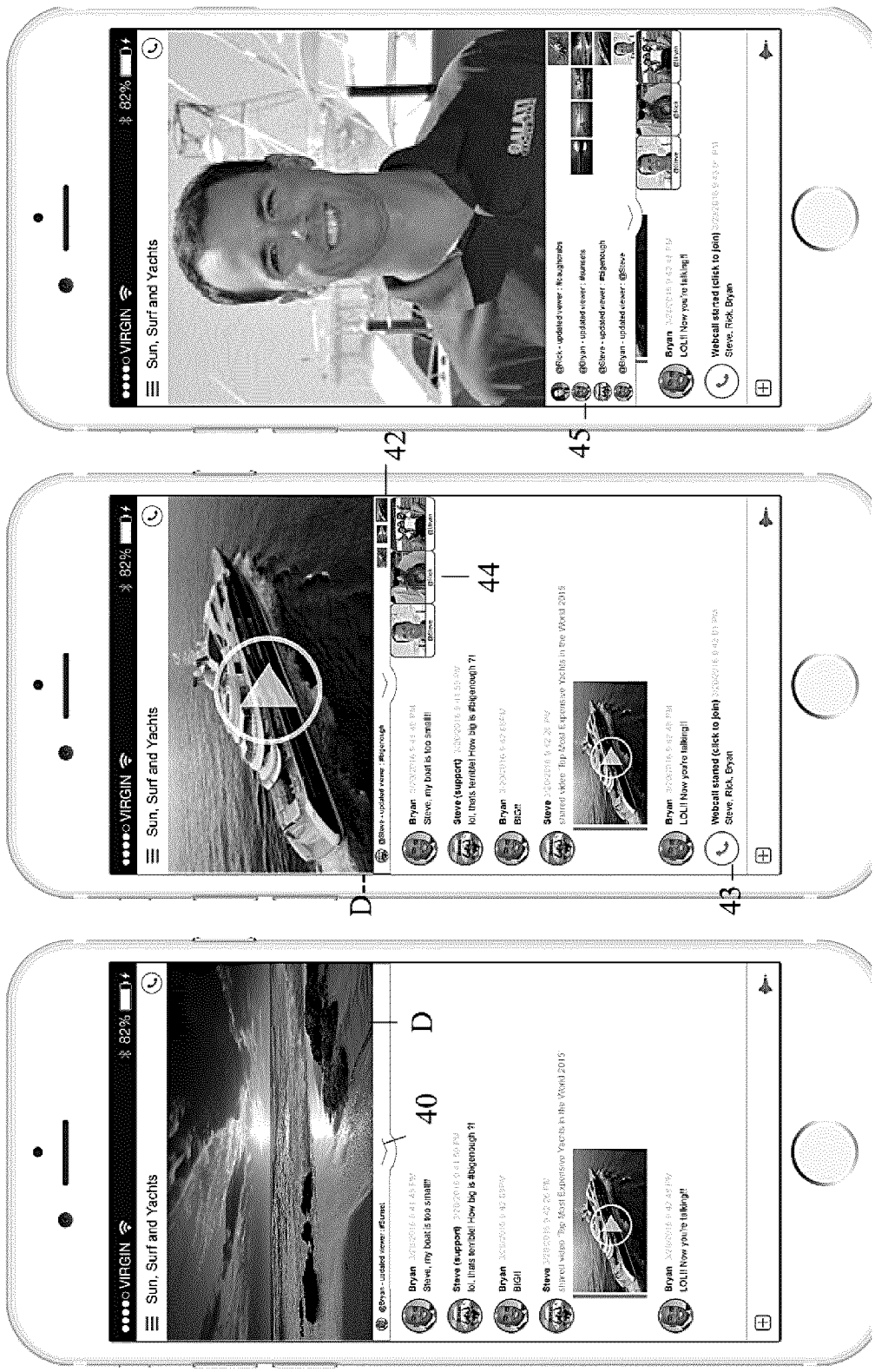

VISUAL MESSAGING METHOD AND SYSTEM

CROSS REFERENCE TO RELATED APPLICATION

The present application claims the benefits, under 35 U.S.C. § 119(e), of U.S. Provisional Application Ser. No. 62/263,446 filed Dec. 4, 2015 entitled "Visual Messaging Method and System" which is incorporated herein by this reference.

TECHNICAL FIELD

The invention relates to the field of smartphone messaging systems, and in particular messaging systems requiring multi-threaded topics.

BACKGROUND

As smartphone messaging systems ("Messaging") continues to rapidly replace email, SMS and phone calls across consumer and business applications, it faces increasing pressure to act more like a platform with app-like functionality. Messaging platforms like Facebook Messenger and Slack are becoming mainstay communication media for consumers and businesses respectively. In all of this, chat or text-based messaging has evolved very little in its ability to convey complex conversations covering multiple topics, integrate external app functionality and display visual media. This leads to a fractured experience where users need to leave the primary conversation to perform in-context tasks in external apps, discuss related topics or view simple media like video and interactive web.

There is a need therefore for a messaging UI/UX (user interface/user experience) design that fixes the fractured messaging experience, allowing users to remain in the primary conversation and perform more complex topic, task and media execution.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present embodiment therefore provides a method of visually organizing multiple parallel chat topics on the display screens of mobile devices used in messaging conversations. Visual media and external apps are integrated into such displays, by forming parallel orthogonally spaced chat threads, where preferably each chat thread has a visual element associated with it displayed in a visual display area. The different chat participants can each manipulate or interact with the visual element of any selected chat thread.

More particularly there is disclosed a method of providing a graphical user interface on the display screens of a plurality of computing devices which are accessible to a computer network to enable a plurality of participants in a messaging conversation to participate in a plurality of parallel chat topics over the course of said conversation, the method comprising: i) providing on the graphical user interface a topic name display area and a vertical chat thread display area; ii) enabling a first participant to start a main chat thread by sending a first message which is displayed in each participant's chat thread display area thereby starting a first main chat topic thread; iii) enabling one or more of said participants to start one or more additional chat topic threads by sending a topic-beginning message which includes a topic name and a topic-creating code and which is displayed in each said participant's chat thread display area; iv) displaying each the topic name in the topic name display area; v) enabling each participant to add messages to each the participant's chat thread display area in relation to one of the topic names by carrying out a topic-adding step; thereby forming a plurality of secondary chat threads in addition to the main chat topic thread in relation to each topic name in parallel with the main chat topic thread. According to a preferred embodiment a visual topic display area is displayed on the graphical user interface, and a participant can select visual content to be displayed in the visual topic display area in association with a topic name. More preferably a participant can navigate between parallel topic threads by selecting a control that replaces a first visual content associated with a first topic name to a second visual content associated with a second or subsequent topic name. Preferably all participants are enabled to view the interaction of one participant with the visual content. In this way all chat participants can interact with the visual content.

The embodiments also describe a non-transitory computer readable storage medium having program code stored thereon for carrying out the method and a system for carrying out the afore-mentioned method.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 10-12 are screen displays of a smartphone illustrating a second embodiment of the invention in which the visual area controls are replaced with touch-activated slide actions.

DESCRIPTION

Figure 1:
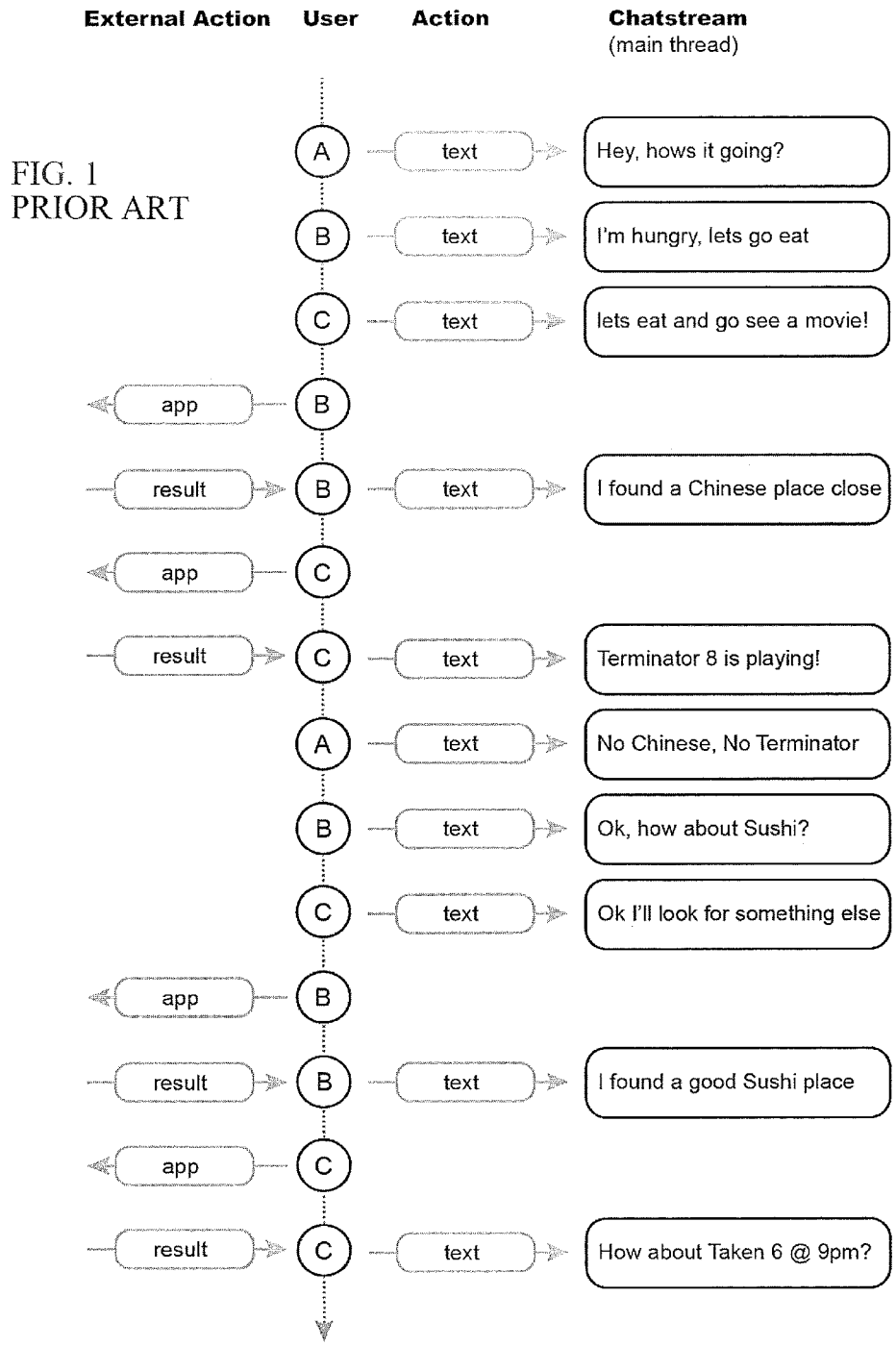
FIG. 1 is a flow chart representing a typical prior art Monothread Chatstream Activity Graph.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

When used herein the term "visual" means visual elements in addition to text. For example a visual display area is an area which can display images in addition to or instead of simple text, such as graphic images and video. "Computing devices" may include smartphones, tablets, laptops, desktops, mobile devices and any other computing device that is accessible to a wired or wireless network and has a display screen. References to actions on a touch screen of a computing device include equivalent actions using a keyboard, mouse or other input device. A "messaging conversation" or "chat conversation" includes a series of messages where a number of participants exchange messages including or consisting of text messages wherein there are at least two common participants over the course of the conversation. The series of such messages is referred to as a "chatstream". A "chat thread" refers to a series of messages in a chatstream which are interrelated, generally by subject or topic, or intended to be responsive to another message in the chat thread.

The 'fractured' messaging experience is a problem facing messaging users in part due to current technology where users must leave the chat environment to perform tasks related to the chat, the results of which are difficult to share back into the original chat. This fractured experience creates the problems with the following areas:

Multiple simultaneous topics;
External App integration;
Visual Media integration.

To address these issues, the embodiments described below provide a messaging UI/UX which accommodates a richer conversation, keeping everything persistent and in-line in one messaging conversation. This also requires looking at the messaging 'chatstream' in any conversation as a continuously growing and evolving graph of nodes and edges rather than just a linear order of related statements. By structuring the chatstream as a growing 'chat graph' of comments and media, an improved UI/UX system gives users a superior messaging environment. By providing a more functional and visually oriented chat interface, Google apps, video chat and Dropbox-like capabilities are more naturally integrated into the messaging environment solving the fractured experience problem.

Multiple Parallel Topics & The 'Kitchen Party' Problem

The Kitchen Party problem in messaging is a well-known phenomenon wherein in chat groups of three people or more, multiple parallel topics of interest arise within the same group—much like where the kitchen at a party becomes the center of the party where many topics are discussed all within close proximity, where participants freely bounce between conversations. This is a desirable natural mode of conversation. The described Messaging UI/UX delivers a more comfortable and effective messaging experience. The problem with current messaging UI/UX is that topics are forced to be delivered serially in the chatstream and unless a user is prepared to scroll back in the chat history, they are ignorant of any other topics discussed other than what they see in real time. The Kitchen Party problem dictates that in every kitchen party, everyone in the kitchen can hear the topics being discussed and freely contribute to each one as they see fit.

Having more than one topic thread per chat often will result in users leaving the primary chat and having a parallel chat with others from the same group for a separate chat around a particular parallel topic. This increases the complexity of the conversation and the risk that topic discovery via scrolling or search will only show topic keywords out of context to the conversation. To preserve topic context, the user must scroll to see the complete context around the topic of interest to fully understand the conversation around that topic. By dedicating the upper part of the chat UI to displaying all current active topics, the user can determine "What are we talking about? What is going on?". To preserve context, a Visual Topic Area is provided to display the current topic and mark subsequent chat entries with that topic focus. This allows the entire conversation to be clearly multi-topic, multi-threaded but with the ability to see all active topics and sequentially related content in the chatstream at a glance, as occurs in a Kitchen Party.

External App Integration & the Visual Area Topic Tabs

In most messaging conversations, topics often lead to the need to perform a task such as searching for a place to eat or seeing a movie together. This then leads to the user leaving the primary chat to open an external application (Google search, Yelp or other), perform the task and then try to communicate the result of that task back into the primary chat. The moment the user leaves the primary chat, that user is disconnected from that ongoing conversation and often misses vital information regarding the task they are trying to fulfil. If the user manages to communicate or share the task information into the chatstream, it is sequential like everything else and will disappear in the chat history, making it difficult to resurface in the conversation or discover.

To try to solve this, some messaging platforms use the concept of in-line 'bots' to perform tasks which can be invoked and respond like a member of the primary conversation. While this method works for current platform supported features and functions, bots cannot perform tasks beyond what the messaging platform supports and are thus extremely limited. There are a small handful of messaging platforms that have begun to allow some third party app integration to provide greater feature access and customisation for their Users (WeChat, Facebook Messenger, Kik, Slack). While this is preferable, users relying on external apps or webview mediated HTML web-apps to perform tasks and then share the results continue to have the chat history problem which involves scrolling out of view and having to re-scroll to access it in the chat history and miss new chat updates.

The present embodiment forms a Visual Topic Area orthogonal to the chatstream which presents a list of topics and task results, a visual summary of the activity in the conversation. This has the added benefit of allowing other users to invoke the same apps directly from the Visual Topic Area to build on the topic tasks from the previous user. For example using Yelp to search for a restaurant, one could share the result in the Visual Topic Area as a picture of the meal selected, the map of the restaurant's location etc. as a persistent entity at the top of the chatstream. The rest of the chat participants can discuss eating there or not, and could click/tap the Visual Area Tab of the restaurant, which would invoke the Yelp app where they could conduct a different search and push those results in to replace the current Visual Tab contents with a different restaurant's details.

Visual Media Integration & the Visual Area Tabs

Like the problems faced by External apps, Visual media is especially challenged as there is currently no way to display persistent in-line Visual media in messaging, without leaving the primary conversation for an external application like Youtube. This may be addressed by allowing visual media to be pushed into a Visual Topic Area D described below, forming a Visual Tab for each vertical chat thread, and enabling direct collaboration by users on the visual media in the Visual Tab. A user can find a video on Youtube for example and share that in a new Visual Tab with the rest of the users in the primary chat. This enables the video controls to be shared so that one of the users can pause or advance the video for the entire group. This also applies for images, allowing users to zoom in or pan and those actions shown in real time for others to see on their own devices.

With reference to FIG. 1, the existing chat stream among users A, B and C operates as a single vertical thread, shown as the "Chatstream (main thread)". In the first three horizontal steps moving from top to bottom, the three users enter text in reply to the previous entries on various topics. At the fourth level user B leaves the chatstream to conduct a search relating to the first topic on a separate app, then returns to the chatstream with the search result. In the sixth level user C leaves the chatstream to conduct a search on a second topic and returns to the chatstream to report the results. Further text entries result in a further search and report back by B.

Figure 2:
FIG. 2 is a screen display of a smartphone showing a typical prior art Monothread Chatstream.

FIG. 2 illustrates the current display of the foregoing chatstream on a smartphone display, which illustrates the single vertical thread.

Figure 3:
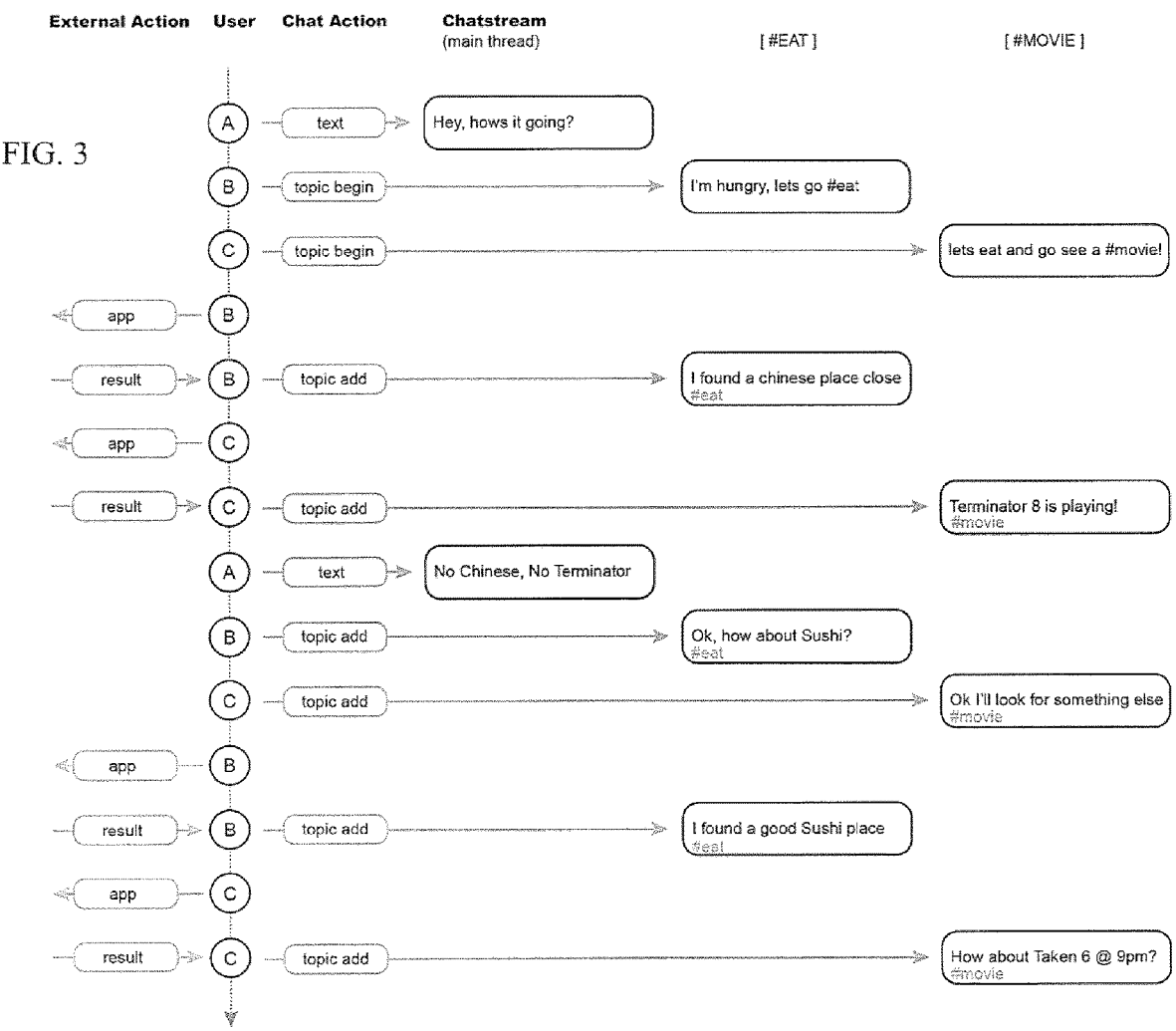
FIG. 3 is a flow chart representing the Parallel Multithread Chatstream Activity Graph provided by the present invention.
Figure 4:
FIG. 4 is a simplified screen display of a smartphone providing the parallel Multithread Chatstream Thread provided by the present invention.

FIG. 3 illustrates a flowchart for the present embodiment of a chatstream with multiple parallel threads. The initial vertical thread is started by user A. User B includes a topic heading "eat" by including a code character, in this case # (hashtag). This is detected by the application as a signal to create a new vertical topic thread/stream for "eat". This is shown as a chat action "topic begin". Similarly C creates a new vertical topic thread/stream for "movie" by including a code character with that term, #movie, as a chat action "topic begin". By performing the chat action "topic add" with respect to a vertical topic thread, the user may add a text element to that vertical topic thread. This is done by including the existing topic heading and code character in the text message or tapping or selecting a topic heading as shown in FIG. 4. Or the user may invoke an application such as a Google search or Youtube application and inject the search result into the vertical topic thread by adding it as a visual element to the topic, as further described with respect to FIG. 5 below.

FIG. 4 illustrates a simplified screen display of a smartphone providing the foregoing parallel Multithread Chatstream Thread. Text entries at the second and third vertical levels, having included the code character # (hashtag) have created topic headings for #eat and #movie which are displayed as horizontally discrete topics from the "main" topic, within a Visual Topic Area 10. By tapping or selecting a topic heading the user may invoke the "topic add" step to add a text entry under that topic or inject a search result from an external app.

Figure 5:
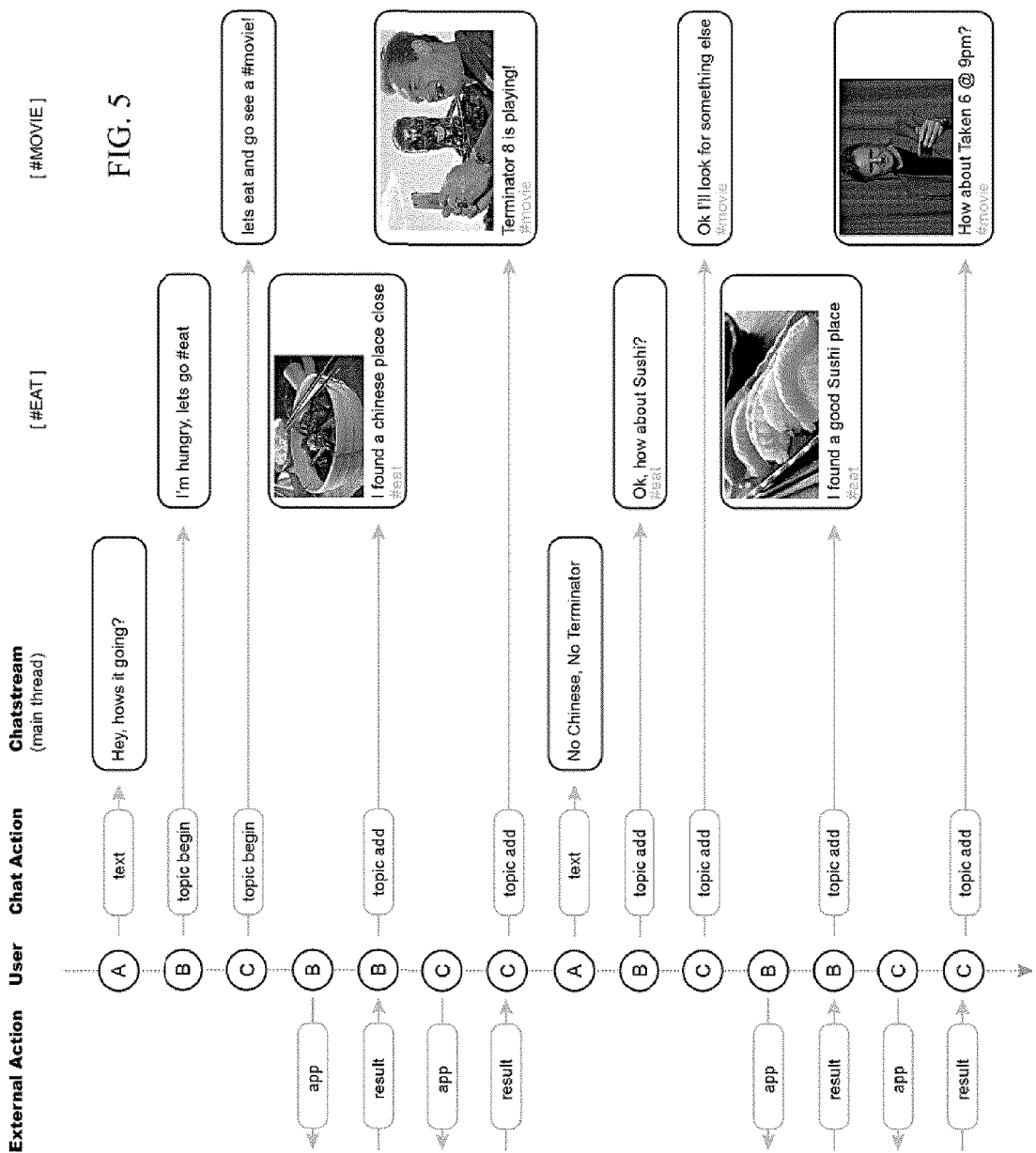
FIG. 5 is a flow chart representing the Visual Parallel Multithread Chatstream Activity Graph provided by the present invention.

FIG. 5 illustrates a flowchart for a chatstream with multiple parallel threads in which the users have injected visual topics into the chat stream. Again the initial vertical thread is started by User A. User B includes a topic heading "eat" by including a code character, in this case # (hashtag). This is detected by the application as a signal to create the new vertical topic thread/stream for "eat". This is shown as a chat action "topic begin". Similarly C creates a new vertical topic thread/stream for "movie" by including a code character with that term, #movie, as a chat action "topic begin". B then initiates an external app, without leaving the chatstream, and by performing the chat action "topic add" with respect to a vertical topic thread, adds a visual element to that vertical topic thread, such as a photo or video. This may be done by invoking an application such as a Google search or Youtube application and injecting the search result into the vertical topic thread by adding it to the topic using "topic add". One process to accomplish this is to have a user click or tap on the Visual Topic Area display on the user's smartphone, which then takes the user to a selected app to inject the image, video or internet link.

Figure 6:
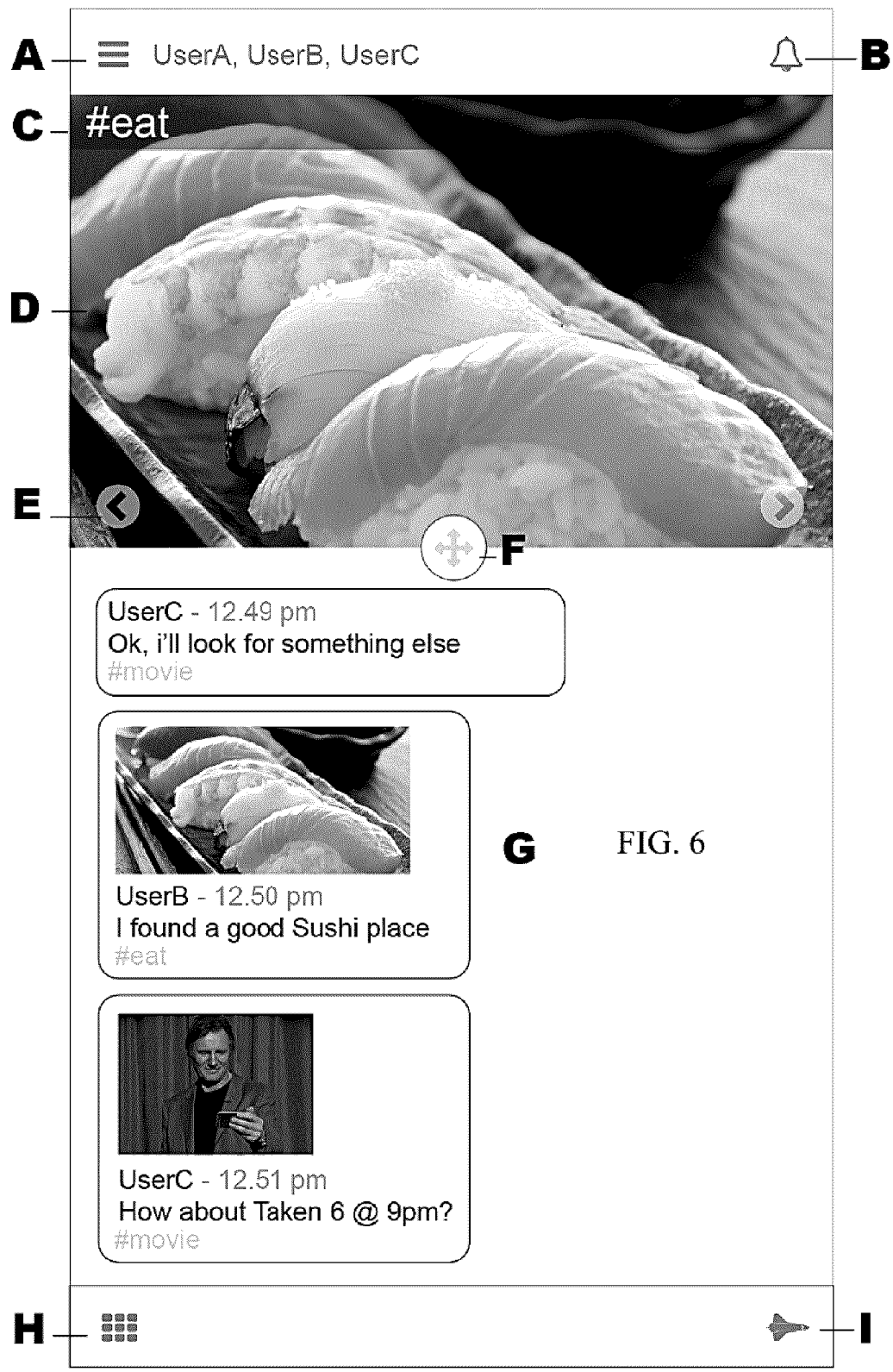
FIG. 6 is a screen display of a smartphone providing the Visual Parallel Multithread Chatstream Thread provided by the present invention.

FIG. 6 illustrates a screen display of a smartphone providing the foregoing parallel Multithread Chatstream Thread with visual areas. The following letters indicate the following screen elements.

A. This is a vertical strip providing information about the currently operating chat conversations. It displays the current users in the conversation. Tapping on the hamburger icon will list all other chat conversations presently active.

B. This is a notification icon which provides an alert to system activity, such as when someone on the chat opens an application, or showing the number of events.

C. This is the title of the Visual Topic Area D. If the visual element has been added to a topic it will generally be the topic title. If it has been injected into a vertical topic stream it will be the title of that topic.

D. This is the Visual Topic Area display panel on the smartphone display. It can be modified as described below.

E. This is the visual tab manipulation button. It permits the user to move between vertical chatstreams or visual display panels. This could be accomplished by a touch-activated slide action also.

F. This is the visual tab display button. It permits the user to modify the size of the visual display as compared to the text chatstream.

G. This is the Chatstream display area, showing the text bubbles and combined visual and text bubbles as entered by the users.

H. This is the app grid button which when tapped opens a display of available apps.

I. This is a visual text button which allows the user to inject text.

The foregoing include examples of some possible control features. Many others will be apparent to those skilled in the art, such as zoom, pan, tap and drag, pinch and zoom and the like. An information app may also be provided to display which users are active in the chat, the number of visual tabs, which user injected which visual tab, and all current visual tabs shown as thumbnails. The visual tab may also have a "close" function.

Figure 7:
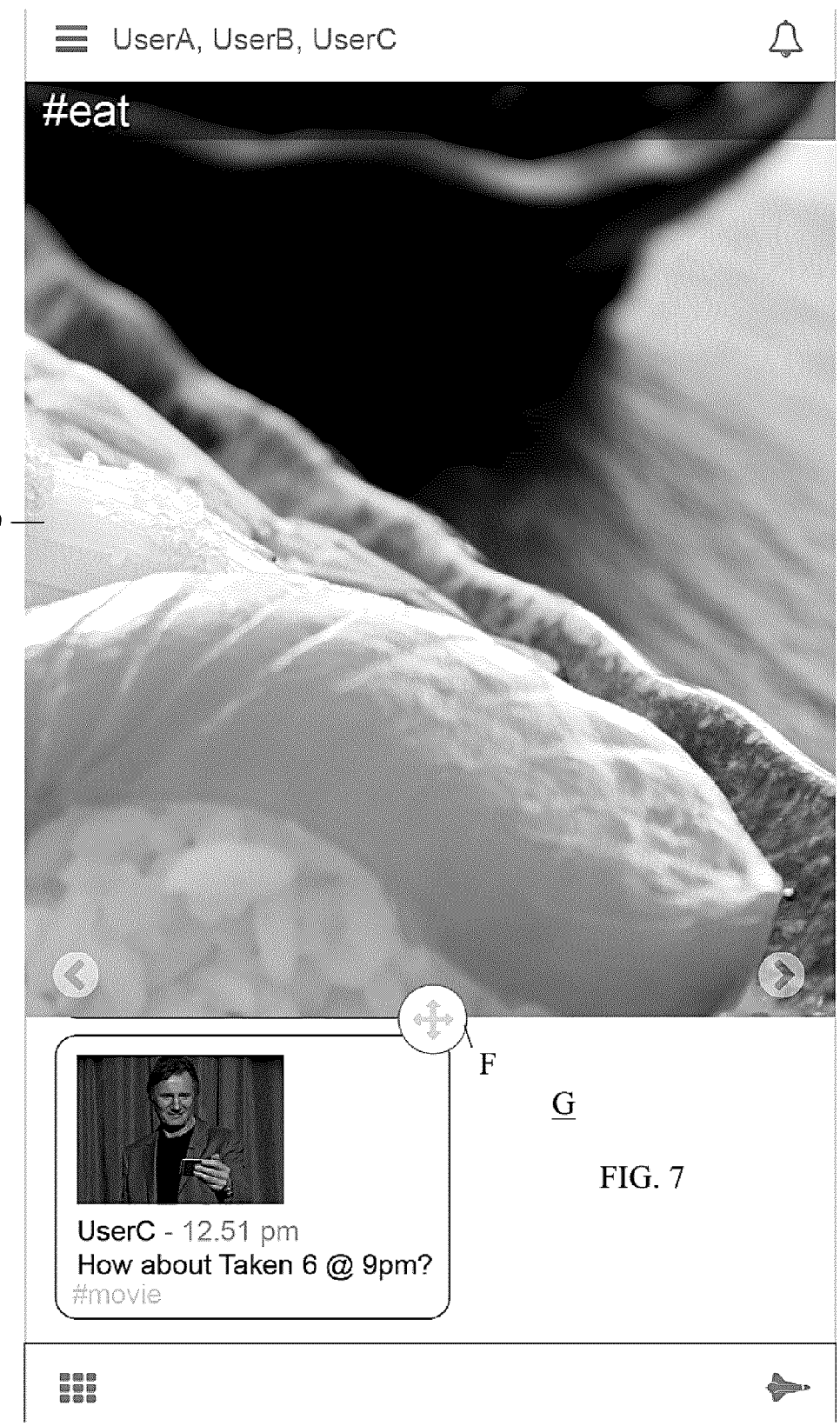
FIG. 7 is a screen display of a smartphone providing the Visual Parallel Multithread Chatstream Thread in which the visual panel has been expanded.

FIG. 7 illustrates a screen display of a smartphone providing the foregoing parallel Multithread Chatstream Thread in which the Visual Topic Area D has been expanded, and the chatstream display area G reduced, using the visual tab display button F.

Figure 8:
FIG. 8 is a screen display of a smartphone providing the Visual Parallel Multithread Chatstream Thread in which a video has been injected into the visual panel.

FIG. 8 illustrates a screen display of a smartphone providing the foregoing parallel Multithread Chatstream Thread in which the photo in FIG. 6 in Visual Topic Area D has been replaced with a video by the user C injecting the video from the Youtube App using "topic add". Alternatively the user can replace the content in the Visual Topic Area D by tapping on the visual element in one of the text bubbles 20.

Figure 9:
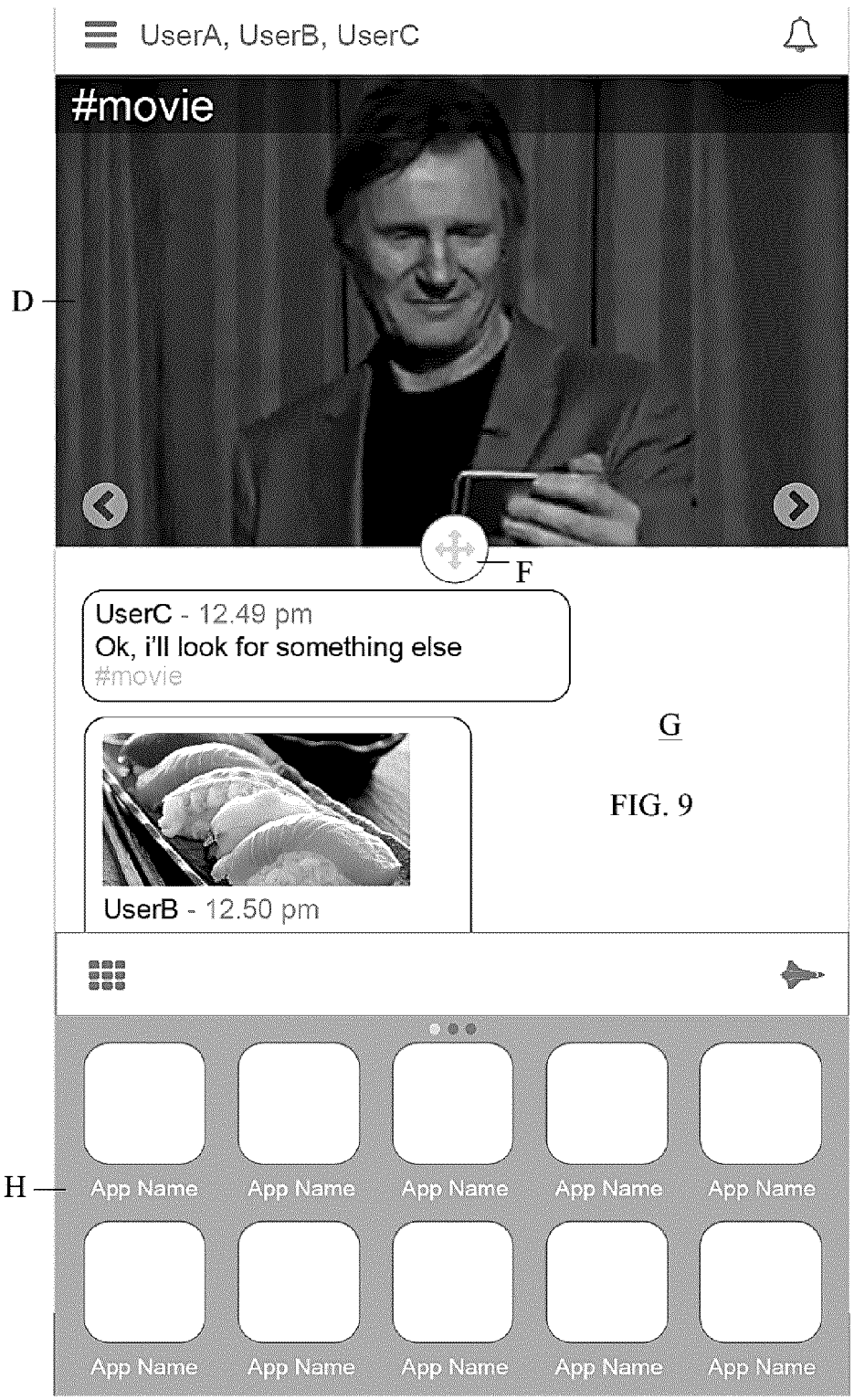
FIG. 9 is a screen display of a smartphone providing the Visual Parallel Multithread Chatstream Thread in which the app grid has been selected.

FIG. 9 illustrates a screen display of a smartphone providing the foregoing parallel Multithread Chatstream Thread in which the app grid H has been activated by tapping or selecting, to display the available apps such as Youtube or a web app. Visual Topic Area D has been expanded, and the chatstream display area G reduced, using the visual tab display button F.

With reference to FIG. 10-12, these diagrams illustrate screen shots of a second embodiment of the visual area controls, namely the visual tab manipulation button E and visual tab display button F, which are replaced with touch-activated slide actions. The visual tab manipulation button E is replaced by a Visual Area Slider Control which permits the user to move between vertical chatstreams or visual display panels by a touch-activated slide action, by touching the screen in Visual Topic Area D and sliding horizontally between different vertical tabs. Generally right/left swipe on the Visual Topic Area D navigates between the various tabs. The visual tab display button F shown in FIG. 6 as a circle and the drag icon is replaced with a Visual Area slider ("Visual Slider") which keeps the visual area clean of encroachment and clutter, as more video content is introduced. The user may use specific tools on top of the Visual Topic Area D content (such as map zoom or layer controls), or the Visual Slider itself may house the tools, notices and other content.

In FIG. 10 Bryan has uploaded a picture of a sunset into the Visual Area D called #sunsets—and this event is recorded in the Visual Slider 40 itself. Simple knowledge graph notation may be used as well for the topic identification, such as '#vancouver>sunsets>3rd beach'. The user can tap and vertically drag the Visual Slider 40 as before to expand or contract the Visual Area D but the Slider icon itself no longer obscures the content. User @Steve creates a new topic '#bigenough' in the message thread in FIG. 10. At this point there may or may not be a new Visual Tab to identify a new vertical topic thread until content is uploaded in that topic thread. @Steve uploads or links a Yacht video as shown and because he has set himself to be commenting in the #bigenough thread, the video shows up on that Visual Tab. There may also be a Visual Tab history of content in that if someone else uploads content with the #bigenough tag, it would replace the current content but there would still be a history of visual tab content for #bigenough.

In FIG. 11 @Steve's Yacht video upload event is injected as the current tab in Visual Area D and recorded in the Visual Slider 30. When the user taps the Visual Slider 40, a series of Visual Tab thumbnails may appear opposite the latest event, with the current Visual Tab being highlighted, as shown at 42. By then tapping a thumbnail the user may navigate to and change the current Visual Tab being displayed. Generally a right/left swipe on the Visual Area D is used to navigate between the various tabs. As the user left or right swipes in the Visual Area D, the Visual Tab thumbnails are shown and once the user stops, they may disappear after a short period. Also shown in FIG. 11, a Webcall 43 has also been started for the group's three users. This event is shown in the conversation stream and the webcall talking heads appear under and attached to the Visual Slider at 44.

As shown in FIG. 12, a group member has tapped one of the talking heads and creates a new Visual Tab dedicated to displaying the chosen talking head—in this case @Bryan taps @Steve's webcall talking head. It may also be that if a user double taps the Visual Slider, it then extends to display more event and Visual Tab information as shown at 45 in FIG. 12. As shown, the Visual Tab #sunsets actually has a history of three images. The user may select a new Visual Tab to jump to or a point in that Visual Tab's display history. Doing so displays the chosen new Visual Tab (and historical state) and shrinks the Visual Slider 40 back to its original size, or that may occur automatically after a set period of no activity, whereby the UI reverts and shrinks back to default by itself.

By allowing visual media to be pushed into a Visual Topic Area D as described, forming a Visual Tab for each vertical chat thread, which is shared among chat participants, direct collaboration by users on the visual media in the Visual Tab is enabled. When a user finds a video on Youtube for example and share that in a new Visual Tab with the rest of the users in the primary chat, the video controls are shared so that any one of the users can pause or advance the video for the entire group. This also applies for images, allowing users to zoom in or pan and those actions shown in real time for others to see on their own devices.

The Visual Topic Area D may be used for Apps and interactive content, as well as images and video. Apps may be loaded directly into a Visual Tab for collaboration. For example a search may be conducted where each user puts a keyword into the query field and then the search is conducted and results shown in the Visual Topic Area. Group users may collaborate on filling out a form together. Group users may manipulate a map and each show their own position or destination for example. One user can mark Bot activity may also be displayed in Visual Topic Area D. The Bot may also display its own information to the group of chat participants in Visual Topic Area D. For example a Bot may be executing a script and each stage of this script may display what the external (non-group) user sees in Messenger, for example, where one user is in Facebook Messenger and is linked to a group using one of the present embodiments. When Bots put content into a chat in Messenger (and others), that information also scrolls up and out of view, whereas in the present embodiments the Bot may have its own visual tab as a topic thread so it always has its tasks and results available without having to scroll back through the history of the chat threads.

When a user interacts with the Visual Topic Area such as by injecting an image or video or moving, expanding or annotating the image, the same modification is displayed on the other user displays for those participating in the chat conversation.

According to one aspect, the activity graph shown in FIG. 3 can be logically constructed in the programming code to follow graph notation in which the chat stream forms as a growing graph of nodes (topics) and edges.

According to the described embodiment therefore, multiple topics can be organized orthogonally in parallel to the main chatstream. This provides a more coherent, understandable visual-based customer interface for the users to conduct multi-topic chats and allows agents to logically organize topics orthogonal to the main chat stream. The addition of a visual area to each vertical topic chatstream into which visual content can be injected adds further practical utility for the chat group.

Example of Application to Facebook Messenger

Figure 15:
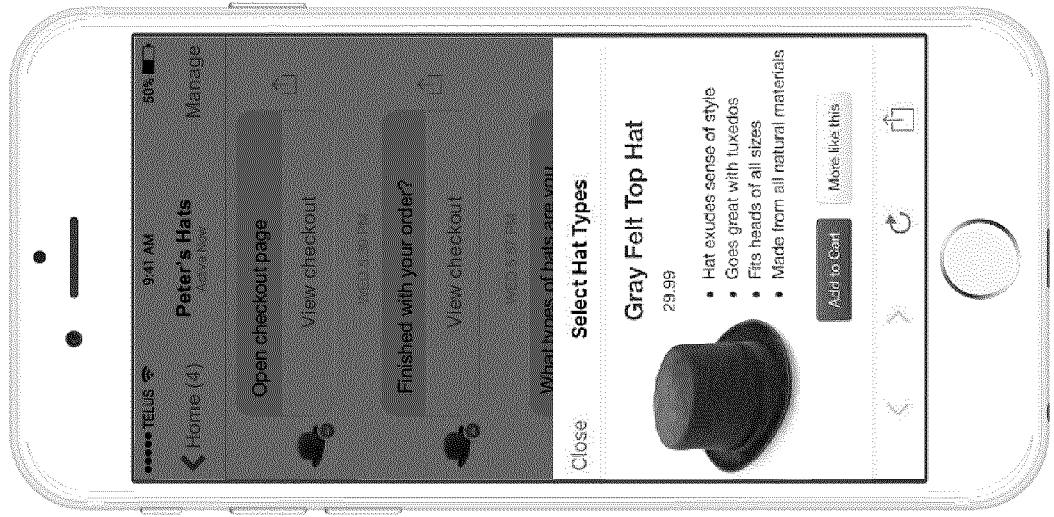
FIG. 13 through 15 illustrate an example of a current operation of Facebook Messenger.
Figure 14:
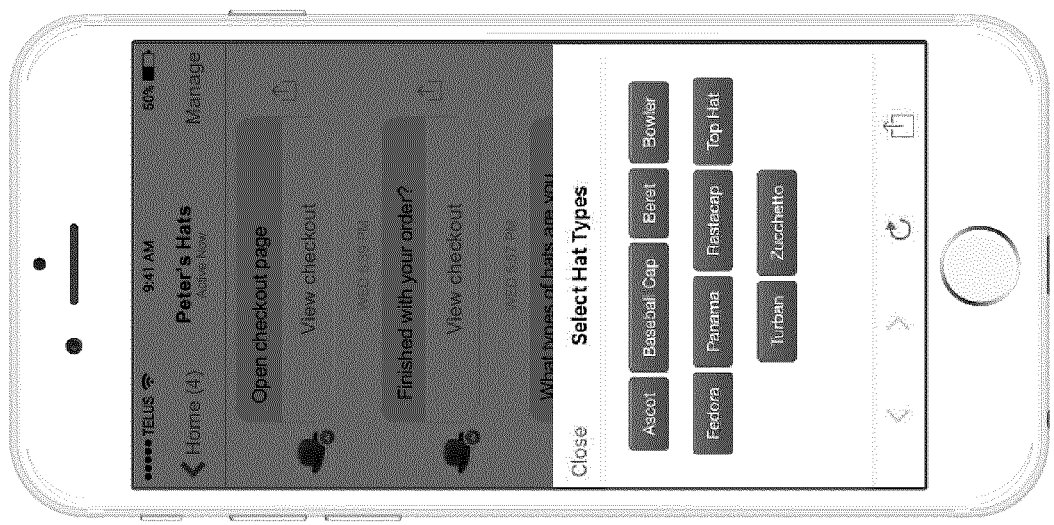
Figure 13:
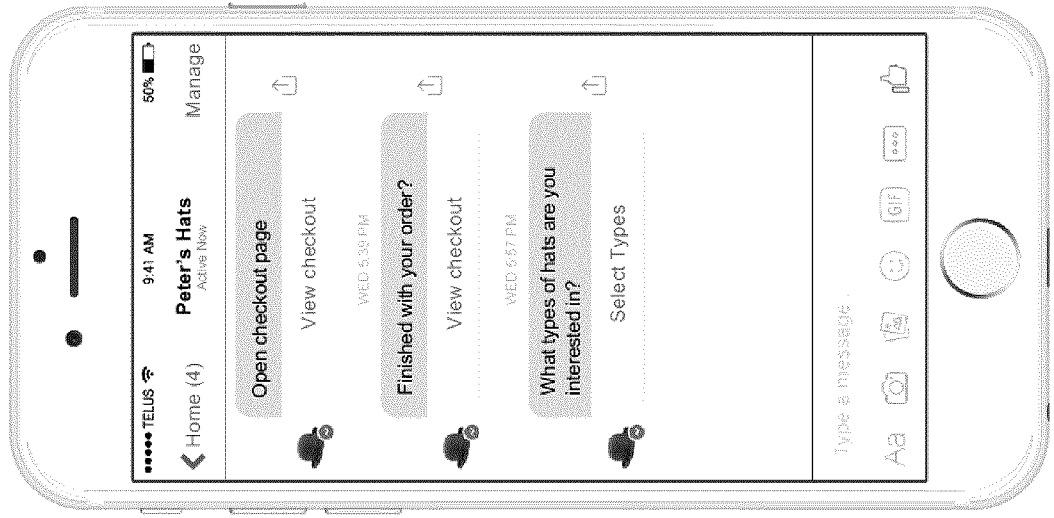
Figure 16:
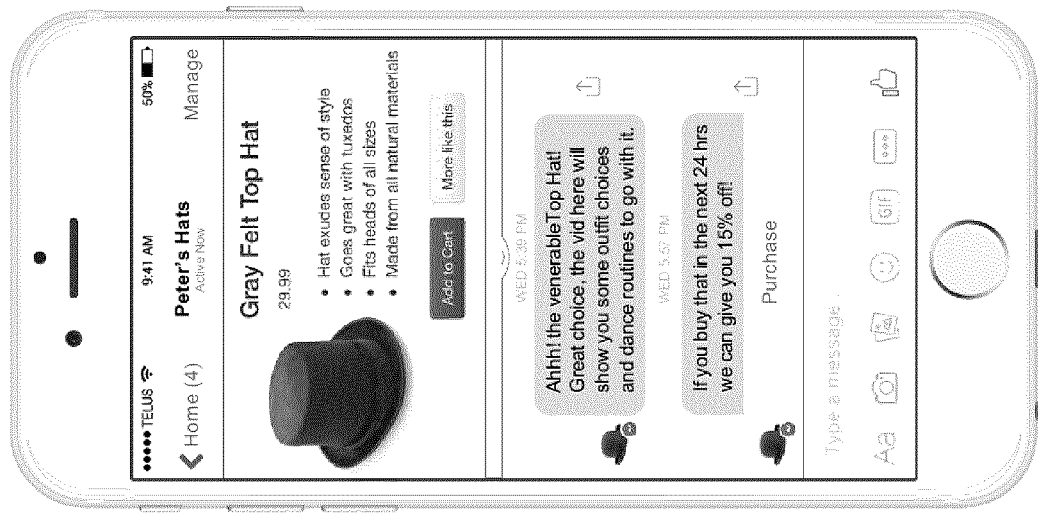
FIG. 16 through 18 illustrate the application of the present invention to the Facebook Messenger operation shown in FIG. 13 through 15.
Figure 17:
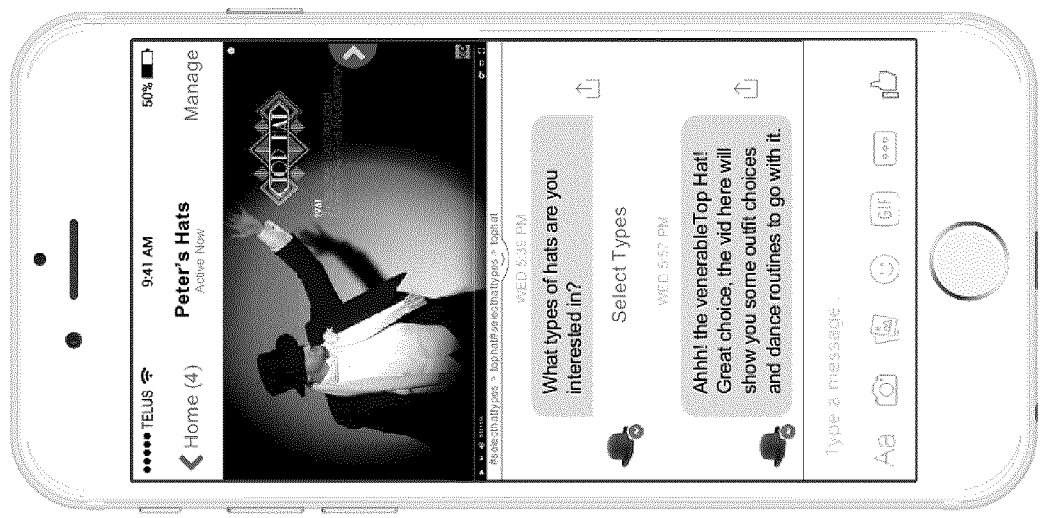
Figure 18:
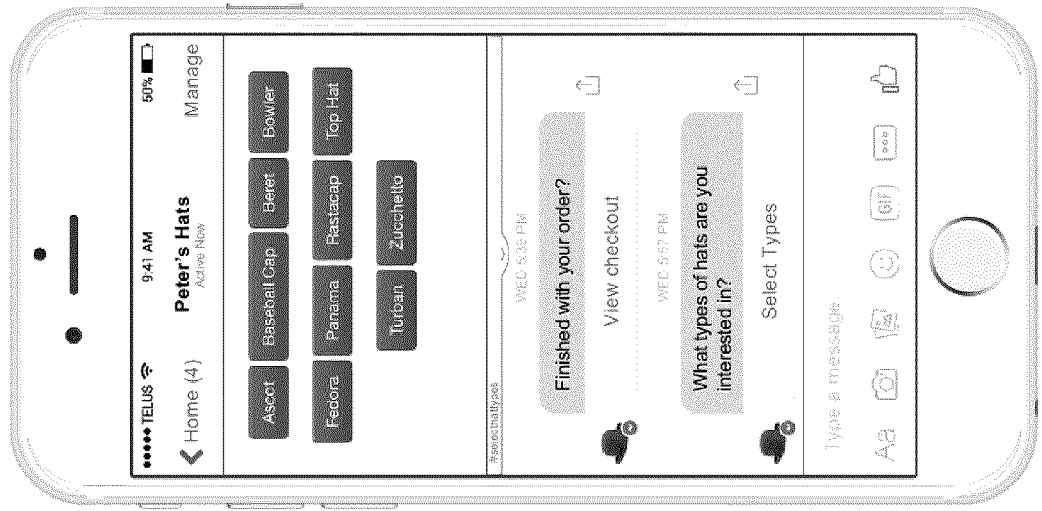

FIG. 13 through 15 illustrate the current operation of Facebook Messenger. In this case when the user taps the 'Select Types' button, Messenger launches a floating mini-browser (webview) that displays HTML, in this case a number of buttons to pick a hat type. The user then taps the blue 'Top Hat' button in the Messenger WebView which opens another web page inside the Messenger Webview with the 'Gray Felt Top Hat' product selector and Add to Cart option. This increases developers' abilities to make shopping in Messenger more viable. FIG. 16 through 18 illustrate the use of the present visual messaging system whereby the webview is fixed to the top of the chat with the visual slider. The user taps the 'Select Types' button and visual tab displays the same HTML in the visual area with name ('#selecthattypes')—for everyone in the chat. The user taps the 'Top Hat' button in the visual area and a video pops up to display a small marketing video, without having to scroll the rest of the conversation up. The Visual Tab name is appended with the user choice. The user taps the grey (>) button on the right hand side of the video and the Product Cart selector again appears while still conserving the conversation history and position.

Thus Messenger currently applies the WebView modal browser window right on top of the conversation, and one cannot type or do anything in Messenger until the WebView window is closed, thereby effectively locking the user out of the conversation. The present visual messaging approach offers better conversational efficiency and focus in that there is a fixed visual area with a fixed topic and the conversation can still run as it should, thereby enhancing the Facebook Messenger user interface and user experience.

While a number of exemplary aspects and embodiments have been discussed above, those of skill in the art will recognize certain modifications, permutations, additions and sub-combinations thereof.

The invention claimed is:

1. A method of providing a graphical user interface on display screens of more than two computing devices which are accessible to a computer network with a parallel multi-thread chatstream activity graph to enable more than two participants in a group messaging conversation to participate in a plurality of parallel chat topics over the course of said conversation said method comprising:
   i) providing on said graphical user interface a visual topic display area and a chat thread display area;
   ii) enabling a first participant to start a main chat thread by sending a first message which is displayed in each participant's chat thread display area thereby starting a first main chat topic thread, and storing the first message associated with the main chat topic in the chatstream activity graph;
   iii) enabling one or more of said participants to start one or more additional chat topic threads by sending a topic-beginning message which includes a topic-creating string comprising a topic heading and a non-alphabetic topic-creating character and which is displayed in each said participant's chat thread display area, and storing the topic-beginning message associated with the topic heading in the chatstream activity graph;
   iv) enabling each participant to add messages to each said participant's chat thread display area in relation to one of said topic headings by carrying out a topic-adding step, wherein the topic-adding step comprises storing each message associated with said one of said topic headings in the chatstream activity graph, thereby forming a plurality of secondary chat threads in addition to said main chat topic thread in relation to each topic heading in parallel with said main chat topic thread;
   v) querying the chatstream activity graph for each topic heading and said main chat topic stored therein, and displaying each said topic heading and said main chat topic in said visual topic display area;
   vi) wherein said visual topic display area on said graphical user interface is located apart from a chronologically-ordered part of a chat thread and is adapted for displaying non-textual images with or without text;
   vii) enabling at least one of said participants to select visual content to be interactively displayed in said visual topic display area in association with a selected chat topic thread whereby said visual content is persistently displayed to said participants taking part in said messaging conversation within said visual display area in association with said selected chat topic thread notwithstanding the addition of message content to said messaging conversation until said selected visual content is removed or changed, storing said visual content associated with the topic heading corresponding to said selected chat topic in the chatstream activity graph, and enabling each said participant to interact with visual content selected by each other participant; and
   viii) enabling at least one of said participants to select the topic heading in said visual topic display area corresponding to the selected chat topic, querying the chatstream activity graph for said visual content associated with the topic heading corresponding to the selected chat topic and one or more messages associated with the topic heading corresponding to the selected chat topic, and displaying said visual content in said visual topic display and the one or more messages in the chat thread display area.

2. The method of claim 1 wherein said topic-adding step comprises selecting one of said topic headings in said visual topic display area or sending a message including one of said topic headings and said topic-creating code character.

3. The method of claim 1 wherein said topic-creating character comprises a hashtag.

4. The method of claim 1 comprising the further step of:
   ix) enabling at least one of said participants to navigate between parallel topic threads by selecting a control that replaces a first visual content associated with a first topic heading with a second visual content associated with a second or subsequent topic heading.

5. The method of claim 1 wherein said visual content is selected from the group consisting of static graphic images, video content, Bot activity, external apps, and other visual media.

6. The method of claim 4 wherein all participants in said messaging conversation are enabled to view an interaction of one participant with said visual content.

7. The method of claim 6 wherein all chat participants are enabled to interact with said visual content.

8. The method of claim 7 wherein each said participant is provided with tools to interact with said visual content.

9. The method of claim 1 wherein said plurality of computing devices comprises smartphones and said computer network is a wireless network.

10. The method of claim 4 wherein said plurality of computing devices comprise mobile devices, smartphones or tablets provided with a touch screen and said participant is enabled to navigate between parallel topic threads by touching said screen to activate a select tool, by touching and swiping or by touching and dragging.

11. The method of claim 1 comprising the further step of:
ix) enabling at least one of said participants to expand or contract said visual topic display area.

12. The method of claim 4 wherein said participant navigates between said parallel topic threads in a direction orthogonal to a vertical chat thread thereby forming an orthogonal chat thread associated with each said visual content.

13. The method of claim 5 wherein said external apps comprise applications for searching, for finding and reviewing services, or for posting and viewing videos.

14. The method of claim 1 wherein said plurality of computing devices comprises smartphones or tablets each provided with a touch screen and wherein said visual content is added to the topic by selecting or tapping on one of said mobile computing devices on one of said topic headings or by selecting or tapping a chat message including said visual content.

15. The method of claim 14 wherein a search result is injected into the topic thread by adding it as a visual element to the topic by selecting or tapping on the display screen on the topic heading.

16. A non-transitory computer readable storage medium having program code stored thereon, wherein the program code, when executed by a mobile computing device operably connected to a network server via a wireless network, provides a graphical user interface on a display screen of said mobile computing device with a parallel multithread chatstream activity graph to enable a participant in a group messaging conversation comprising more than two participants to participate in a plurality of parallel chat topics over the course of said conversation, the program code comprising the steps of:
i) providing on said graphical user interface a visual topic display area and a chat thread display area;
ii) enabling a first participant to start a main chat thread by sending a first message which is displayed in each participant's chat thread display area thereby starting a first main chat topic thread, and storing the first message associated with the main chat topic in the chatstream activity graph;
iii) enabling one or more of said participants to start one or more additional chat topic threads by sending a topic-beginning message which includes a topic-creating string comprising a topic heading and a non-alphabetic topic-creating character and which is displayed in each said participant's chat thread display area, and storing the topic-beginning message associated with the topic heading in the chatstream activity graph;
iv) enabling each participant to add messages to each said participant's chat thread display area in relation to one of said topic headings by carrying out a topic-adding step, wherein the topic-adding step comprises storing each message associated with said one of said topic headings in the chatstream activity graph, thereby forming a plurality of secondary chat threads in addition to said main chat topic thread in relation to each topic heading in parallel with said main chat topic thread;
v) querying the chatstream activity graph for each topic heading and said main chat topic stored therein, and displaying each said topic heading and said main chat topic in said visual topic display area;

vi) wherein said visual topic display area on said graphical user interface is located apart from a chronologically-ordered part of a chat thread and is adapted for displaying non-textual images with or without text;
vii) enabling at least one of said participants to select visual content to be interactively displayed in said visual topic display area in association with a selected chat topic thread whereby said visual content is persistently displayed to said participants taking part in said messaging conversation within said visual display area in association with said selected chat topic thread notwithstanding the addition of message content to said messaging conversation until said selected visual content is removed or changed, storing said visual content associated with the topic heading corresponding to said selected chat topic in the chatstream activity graph, and enabling each said participant to interact with visual content selected by each other participant; and
viii) enabling at least one of said participants to select the topic heading in said visual topic display area corresponding to the selected chat topic, querying the chatstream activity graph for said visual content associated with the topic heading corresponding to the selected chat topic and one or more messages associated with the topic heading corresponding to the selected chat topic, and displaying said visual content in said visual topic display and the one or more messages in the chat thread display area.

17. The non-transitory computer readable storage medium of claim 16 wherein said program code further performs the tasks of enabling each participant to navigate between parallel topic threads by selecting a control that replaces a first visual content associated with a first topic heading with a second visual content associated with a second or subsequent topic heading, viewing the interaction of one participant with said visual content, and interacting with said visual content.

18. A system comprising a plurality of mobile computing devices which are operably connected to a network server via a wireless network, wherein each mobile computing device comprises a non-transitory computer readable storage medium having program code stored thereon, wherein the program code, when executed by the mobile computing device, provides a graphical user interface on a display screen of the computing device to enable at least one of said participants in a messaging conversation to participate in a plurality of parallel chat topics over the course of said conversation using the method of claim 1.

19. The method of claim 1 wherein said visual content comprises graphic images, multimedia content, video content, apps, audio content or a real-time interactive Internet link.

20. The method of claim 1 wherein the size of said visual topic display area is adjustable by each participant.

21. The method of claim 20 wherein said visual topic display area is adjustable by providing a vertically adjustable slider tool to permit a participant to tap and vertically drag said slider tool to expand or contract said visual topic display area.

22. The method of claim 1 wherein said interaction by one participant is collaborative with the other participants whereby all participants are enabled to view the interaction of one participant with said visual content.

23. The method of claim 22 wherein said visual content comprises a video and said interaction by one participant comprises pausing and advancing the video.

24. The method of claim 22 wherein said visual content comprises a graphic image and said interaction by one participant comprises zooming in on or panning said graphic image.

25. The method of claim 20 wherein said visual topic display area is adjustable by tap and drag or pinch and zoom functions.

26. The method of claim 15 wherein said visual content is replaced or inserted by invoking an application, conducting a search using said application, and injecting the search result into said selected chat topic thread by adding it to said selected chat topic thread.

27. The method of claim 26 wherein one of said participants clicks or taps on the visual topic display area on the user's graphical user interface which takes the user to a selected app to inject an image, video or internet link.

28. The method of claim 1 wherein one of said participants moves between chat topic threads by one or more actions selected from the group consisting of i) selecting a topic name; ii) activating a tab manipulation tool which permits the participant to move between chat threads or visual topic display areas; and iii) a touch-activated slide action to slide horizontally between visual topic display areas.

29. The method of claim 1 wherein one of said participants replaces the visual content in the visual topic display area by tapping on a visual element in a text bubble.

30. The method of claim 1 wherein one of said participants activates an app grid by selecting said grid to display available apps and selects one of said available apps for insertion of said selected available app or visual content from said selected available app into said visual content display area.

31. The method of claim 1, the method further comprising:
   x) enabling at least one of said participants to select said main chat topic in said visual topic display area, querying the chatstream activity graph for one or more messages associated with said main chat topic, and displaying said one or more messages associated with the main chat topic in the chat thread display area.

* * * * *